United States Patent
Desjoyeaux et al.

(10) Patent No.: US 11,235,492 B2
(45) Date of Patent: Feb. 1, 2022

(54) TUBULAR FIBROUS STRUCTURE WITH LOBES

(71) Applicant: Safran Nacelles, Gonfreville l'Orcher (FR)

(72) Inventors: Bertrand Desjoyeaux, Moissy Cramayel (FR); Benjamin Provost, Moissy Cramayel (FR); Fabien Depeux, Moissy Cramayel (FR); Davi Silva De Vasconcellos, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 16/693,551

(22) Filed: Nov. 25, 2019

(65) Prior Publication Data

US 2020/0095954 A1    Mar. 26, 2020

Related U.S. Application Data

(63) Continuation of application No. PCT/FR2018/051203, filed on May 18, 2018.

(30) Foreign Application Priority Data

May 23, 2017   (FR) .................... 17/54578

(51) Int. Cl.
| | |
|---|---|
| *D03D 1/00* | (2006.01) |
| *D03D 3/02* | (2006.01) |
| *D03D 3/08* | (2006.01) |
| *D03D 13/00* | (2006.01) |
| *B32B 1/08* | (2006.01) |

(Continued)

(52) U.S. Cl.
CPC ............ *B29B 11/16* (2013.01); *B29C 70/222* (2013.01); *D03D 3/08* (2013.01); *D03D 13/00* (2013.01); *F02K 1/48* (2013.01); *B29L 2031/748* (2013.01)

(58) Field of Classification Search
CPC .. D03D 3/02; D03D 3/08; D03D 1/00; D03D 13/00; B32B 1/08; B32B 18/00; B32B 5/024; F02K 1/48
See application file for complete search history.

(56) References Cited

U.S. PATENT DOCUMENTS

| | | | | |
|---|---|---|---|---|
| 3,749,138 A | * | 7/1973 | Rheaume ............... | D03D 11/00 139/408 |
| 7,677,026 B2 | * | 3/2010 | Conete ..................... | F02K 1/48 60/262 |

(Continued)

FOREIGN PATENT DOCUMENTS

| | | |
|---|---|---|
| FR | 2875854 | 3/2006 |
| GB | 2484349 | 4/2012 |
| WO | 2014/007907 | 1/2014 |

OTHER PUBLICATIONS

International Search Report for International patent application PCT/FR2018/051203, dated Sep. 19, 2018.

*Primary Examiner* — Joanna Pleszczynska
(74) *Attorney, Agent, or Firm* — Burris Law, PLLC

(57) ABSTRACT

A tubular structure having lobes is produced as a single piece over at least two lobes. Circumferential fibres of the structure have a constant orientation with respect to the longitudinal axis (A) of the structure in any plane (P) transverse to the longitudinal axis. The structure is obtained by weaving or by filament winding.

14 Claims, 1 Drawing Sheet

(51) Int. Cl.
B32B 5/02 (2006.01)
F02K 1/48 (2006.01)
B29B 11/16 (2006.01)
B29C 70/22 (2006.01)
B29L 31/00 (2006.01)

(56) References Cited

U.S. PATENT DOCUMENTS

2010/0005780 A1* 1/2010 Philippe .................. F02K 1/386
　　　　　　　　　　　　　　　　　　60/262
2016/0159698 A1* 6/2016 Landwehr ............. C04B 35/806
　　　　　　　　　　　　　　　　　　501/88
2016/0376928 A1* 12/2016 Lefebvre ................. B01F 3/026
　　　　　　　　　　　　　　　　　　60/317

* cited by examiner

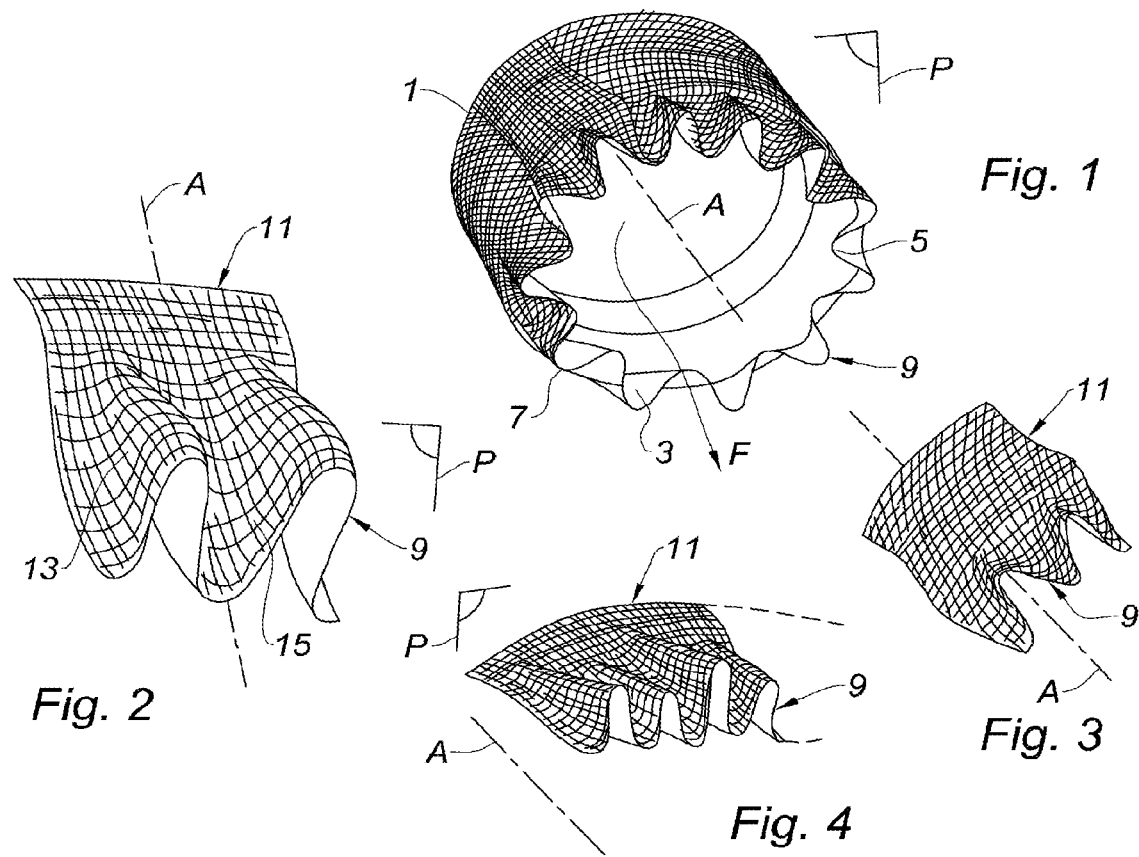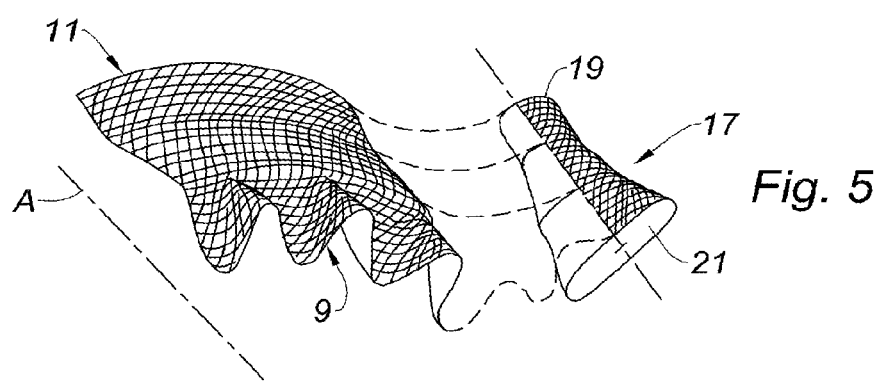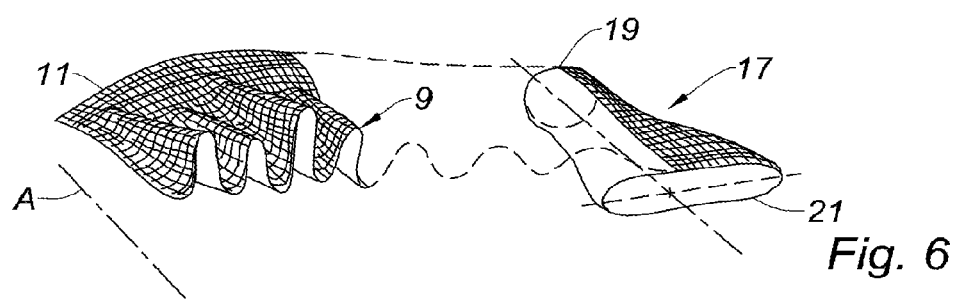

TUBULAR FIBROUS STRUCTURE WITH LOBES

CROSS-REFERENCE TO RELATED APPLICATIONS

This application is a continuation of International Application No. PCT/FR2018/051203, filed on May 18, 2018, which claims priority to and the benefit of FR 17/54578 filed on May 23, 2017. The disclosures of the above applications are incorporated herein by reference.

FIELD

The present disclosure relates to a circular fibrous structure with lobes, as well as to a tubular part with lobes incorporating this fibrous structure.

BACKGROUND

The statements in this section merely provide background information related to the present disclosure and may not constitute prior art.

Such a part can be used in particular in the aeronautical industry: an example of such a part is a flow mixer intended to equip the trailing edge of a bypass turbojet engine nozzle, separating the hot and cold air flows, in order to promote the mixing of these flows in order to increase the thrust and reduce noise emissions.

Such a flow mixer substantially has an axial symmetry around the main axis of the turbojet engine, and typically includes upstream (with respect to the air flow direction) a circular shell, and downstream lobes which get larger up to the trailing edge.

In the prior art, such a flow mixer is obtained from a plurality of fibers laps that overlap at least partially, which requires multiple cutting (and therefore many scraps) and a complex implementation by hand.

In addition, the overlapping of the different laps generates overweight, as well as aerodynamic imperfections, which is detrimental in terms of fuel consumption and acoustics.

SUMMARY

The present disclosure provides a circular fibrous structure with lobes, remarkable in that it is formed in one piece, and in that its circumferential fibers have a constant orientation with respect to the longitudinal axis of said structure, in any plane transverse to said axis.

In the context of the present disclosure, the term "circular" or "tubular" should be understood as a structure extending over part or all of a circumference.

It should be understood by the term "constant orientation" that the fibers replicate similar orientations from one lobe to an identical neighboring lobe. The fibers are continuous in the circumferential direction.

It should also be understood that each circumferential fiber is not necessarily contained within the same plane transverse to said axis but replicates an equivalent geometry from one lobe to an identical neighboring lobe.

Thanks to the features of the fibrous structure according to the present disclosure, it is possible to get rid of an implementation of a plurality of fibers laps as has been the case in the prior art, and thus gain in implementation speed, cost, and in-flight performance.

In addition, the constant orientation of the fibers with respect to the longitudinal axis of the structure allows completely controlling the stress paths inside the structure, and thus improving the design of the final part, in particular in terms of weight.

According to other optional features of the fibrous structure according to the present disclosure, considered alone or in combination:

the fibrous structure comprises between two lobes and up to a plurality of lobes;

the fibrous structure comprises lobes with different shapes;

the fibrous structure comprises longitudinal fibers inclined with respect to said longitudinal axis;

the inclination of said longitudinal fibers with respect to said axis varies depending on the position of said transverse plane;

the fibrous structure comprises a constant or variable circumferential density of longitudinal fibers;

the fibrous structure comprises a constant or variable longitudinal density of circumferential fibers;

the material(s) forming said fibers are selected from the group comprising glass, basalt, carbon, silicon carbide, aluminum oxides, aluminosilicates, and/or the fibrous structure is obtained/formed by weaving or by filament winding.

The fibers are called longitudinal according to their insertion into a drapery forming a lobe of the structure. Such longitudinal fibers have similar orientations from one lobe to another identical neighboring lobe. More particularly, longitudinal fibers may be parallel over a cylindrical segment of the structure, other longitudinal fibers may be inclined and contained in radial planes of the structure and other longitudinal fibers may have varying angles along their length.

Advantageously, there are similar fibers orientations on two neighboring and identical lobes without the need to break up fabric cuts forming the draping of the shape. The mechanical properties resulting from such a structure are advantageously similar from one lobe to the other.

The present disclosure also relates to a composite part obtained from a structure in accordance with the foregoing, embedded in a matrix.

According to other optional features of the part according to the present disclosure, considered alone or in combination:

the part comprises lobes having different shapes;

the part comprises lobes whose height and shape are variable, conferring a variable perimeter depending on the position of the transverse plane; and/or the perimeter of the part in the area of the lobes is larger than the smallest circumference of the part in the area without lobes.

The present disclosure also relates to a flow mixer for an aircraft turbojet engine, which is remarkable in that it is formed by a part in accordance with the foregoing.

The present disclosure also relates to a method for manufacturing a tubular fibrous structure with lobes, in which the fibrous structure is woven around a take-up mandrel having a shape corresponding to that of the fibrous structure.

According to other optional features of the method according to the present disclosure, the above-mentioned fibrous structure is unwound from its take-up mandrel, and it is deployed and wound on a tool whose shape corresponds to that of said part.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a flow mixer for a turbojet engine according to the present disclosure;

FIG. 2 is a perspective view of a portion of a fibrous structure covering two lobes, for making a tubular part with lobes;

FIG. 3 is a perspective view of a variant of a fibrous structure with inclined fibers;

FIG. 4 is a perspective view of a variant of a fibrous structure portion for a flow mixer, comprising lobes with different shapes and heights;

FIG. 5 illustrates a method for manufacturing a fibrous structure with inclined fibers of FIG. 3; and FIG. 6 illustrates a method for manufacturing a fibrous structure of FIG. 2 or 4.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, there is represented a mixer for an aircraft turbojet engine, centered around a longitudinal axis A.

Such a mixer typically comprises an upstream portion 1 (with respect to the direction of the air flow in operation, indicated by the arrow F) with a substantially circular cross-section, and a downstream portion 3 having recesses 5 and bosses 7, commonly called "lobes" 9.

Such a mixer is intended to be disposed on the trailing edge of the nozzle separating the cold air flow from the hot air flow of a bypass aircraft turbojet engine, in order to achieve a better mixing of these two flows, and thus improve the acoustic performance and the consumption of the engine.

According to the present disclosure, the mixer is made of a composite material comprising a matrix (which may be based on ceramics for example) trapping at least one fibrous structure 11, the fibrous structure 11 extending over at least two lobes of the mixer, as shown in FIG. 2.

In one form, the fibrous structure 11 extends over all of the lobes of the mixer, possibly making several turns: in this way, the fibrous structure of the mixer is made in one piece, which avoids cutting and partially superimposing laps of fibrous structure as has been the case in the prior art.

As shown in FIG. 2, the longitudinal fibers 13 may be parallel to the axis A, and the circumferential fibers 15 are contained in transverse planes P perpendicular to this axis.

Alternatively, as shown in FIG. 3, the longitudinal fibers 13 are inclined with respect to the axis A.

This inclination may be constant over the entire length of these longitudinal fibers, or vary along this length, while remaining constant in any transverse plane P.

This inclination may typically range up to 45 degrees.

In FIGS. 2 and 3, the lobes of the fibrous structure 11 are identical, but it may also be considered that all or part of these lobes are different from each other, as shown in FIG. 4.

In one form, but without limitation, the circumferential density of longitudinal fibers 13 is constant.

In another form, but without limitation, the longitudinal density of circumferential fibers 15 is constant.

Optionally, and as shown in particular in FIG. 1 appended hereto, the perimeter of the part in the area of the lobes is larger than the smallest circumference of the part in the area of the lobes.

The material(s) forming said fibers 13, 15 are, in one form, selected from the group consisting of glass, basalt, carbon, silicon carbide, aluminum oxides, aluminosilicates.

The fibrous structure 11 can be obtained by weaving or filament winding.

The present disclosure also relates to a method for manufacturing a tubular fibrous structure with lobes, in which the fibrous structure is woven around a take-up mandrel having a shape corresponding to that of the fibrous structure.

In FIG. 5, there is schematically represented a method for manufacturing the fibrous structure 11 of FIG. 3.

As shown in FIGS. 5 and 6, at the output of a loom (not represented) there is disposed a take-up mandrel 17 which is a kind of spool with a particular shape on which the weft and warp yarns emerging from the loom are wound.

The weft yarns are intended to form the longitudinal fibers 13 of the fibrous structure 11, and the warp yarns are intended to form the circumferential fibers 15 of this fibrous structure.

Due to its particular shape, getting progressively from a circular section 19 to an oblong section 21, the take-up mandrel 17 allows pulling the warp yarns emerging from the loom at different speeds, and thus constituting a fibrous structure which, once unwound from this mandrel, can be deployed and wound on a tool whose shape corresponds to that of the mixer to obtain.

In FIG. 6, there is represented a variant of the method according to the present disclosure, in which an asymmetrical take-up mandrel 17 is used allowing making a fibrous structure with different lobes, as is the case with the fibrous structure represented in FIG. 4.

In FIG. 5, there is represented a variant of the method according to the present disclosure, in which the preform includes inclined longitudinal fibers, which have been wound inclined on the take-up mandrel 17.

In one form, the tubular part with lobes of FIG. 1 is constituted by several layers of preforms according to the present disclosure, which may be of one type or of several different types. In FIG. 1 are presented successively along the circumference of the mixer, a portion of a fibrous preform according to the present disclosure including circumferential fibers and longitudinal fibers inclined to the right, a portion of a fibrous preform according to the present disclosure including circumferential fibers and longitudinal fibers substantially parallel to the axis A of the tubular part, and a portion of a fibrous preform according to the present disclosure including circumferential fibers and longitudinal fibers inclined to the left.

Thus, by superposition of fibrous preforms according to different types containing fibers in different directions, the stiffness and the strength of the composite structure of the mixer are enhanced.

Depending on the shape repetition of the lobes of the tubular part, each fibrous preform may cover from 2 lobes or up to one full turn or more than one turn of the tubular part. In particular, if the lobes are identical or if one in two are identical, it will be possible to constitute a full turn at least of the part with lobes with the same preform.

Before or after winding on the tool in the final shape, the fibrous structures 11 are impregnated with the material intended to form the composite matrix. Following that is the curing of the matrix to stiffen the part.

Of course, the present disclosure is not limited to the described and represented forms, provided as an illustrative and non-limiting example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A one piece fibrous structure comprising:
   at least two lobes formed only of a single piece; and
   circumferential fibers having a constant orientation with respect to a longitudinal axis of the fibrous structure in a plane transverse to the longitudinal axis, wherein the fibrous structure is formed by weaving or by filament winding and the circumferential fibers are continuous across the at least two lobes in a circumferential direction.

2. The fibrous structure according to claim 1 further comprising more than two lobes.

3. The fibrous structure according to claim 1, wherein the lobes define different shapes.

4. The fibrous structure according to claim 1 further comprising longitudinal fibers inclined with respect to the longitudinal axis.

5. The fibrous structure according to claim 4, wherein a position of an intersection of the longitudinal fibers with respect to the longitudinal axis varies depending on a position of said plane transverse to the longitudinal axis.

6. The fibrous structure according to claim 1 further comprising a constant circumferential density of longitudinal fibers.

7. The fibrous structure according to claim 1 further comprising a constant longitudinal density of circumferential fibers.

8. The fibrous structure according to claim 1 further comprising longitudinal fibers, wherein a material forming the longitudinal fibers and the circumferential fibers is selected from the group consisting of glass, basalt, carbon, silicon carbide, aluminum oxides, and aluminosilicates.

9. A composite part formed by at least one fibrous structure according to claim 1 embedded in a matrix.

10. The composite part according to claim 9, wherein lobes of the at least one fibrous structure define different shapes.

11. The composite part according to claim 9, wherein a height of the lobes is variable depending on a position of the transverse plane.

12. A flow mixer for an aircraft turbojet engine, the flow mixer formed by a composite part according to claim 9.

13. A method for manufacturing a tubular fibrous structure according to claim 1, the method comprising weaving the fibrous structure around a take-up mandrel having a shape corresponding to a shape of the fibrous structure.

14. A method for manufacturing a composite part, the method comprising:
   manufacturing at least one fibrous structure according to claim 1 by weaving fibers around a take-up mandrel having a shape corresponding to a shape of the at least one fibrous structure;
   unwinding the at least one fibrous structure from the take-up mandrel; and
   deploying and winding the at least one fibrous structure on a tool having a shape corresponding to a shape of the composite part.

* * * * *